United States Patent
Fiore et al.

(10) Patent No.: US 8,965,175 B2
(45) Date of Patent: Feb. 24, 2015

(54) DATA RECORDING AND PLAYBACK SYSTEM AND METHOD

(75) Inventors: John T. Fiore, Derwood, MD (US); K. Stephen Book, Fairfax, VA (US); Wayne L. Kilmer, Sartell, MN (US)

(73) Assignee: Monitoring Technology Corporation, Fairfax, VA (US)

( * ) Notice: Subject to any disclaimer, the term of this patent is extended or adjusted under 35 U.S.C. 154(b) by 2734 days.

(21) Appl. No.: 10/118,311

(22) Filed: Apr. 9, 2002

(65) Prior Publication Data

US 2002/0191952 A1 Dec. 19, 2002

Related U.S. Application Data

(60) Provisional application No. 60/282,162, filed on Apr. 9, 2001.

(51) Int. Cl.
| | |
|---|---|
| H04N 9/80 | (2006.01) |
| H04N 5/77 | (2006.01) |
| H04N 5/775 | (2006.01) |
| H04N 21/433 | (2011.01) |
| H04N 5/76 | (2006.01) |
| H04N 9/804 | (2006.01) |
| H04N 5/765 | (2006.01) |
| H04N 5/781 | (2006.01) |

(52) U.S. Cl.
CPC ............. *H04N 21/4331* (2013.01); *H04N 5/76* (2013.01); *H04N 9/8042* (2013.01); *H04N 5/765* (2013.01); *H04N 5/775* (2013.01); *H04N 5/781* (2013.01)
USPC ............................ 386/241; 386/224; 386/230

(58) Field of Classification Search
USPC .............. 386/46, 68, 124; 348/148, 143, 571, 348/714; 711/100; 707/205
See application file for complete search history.

(56) References Cited

U.S. PATENT DOCUMENTS

| | | | |
|---|---|---|---|
| 5,319,453 A | | 6/1994 | Copriviza et al. |
| 5,371,551 A | | 12/1994 | Logan et al. |
| 5,490,247 A | | 2/1996 | Tung et al. |
| 5,625,410 A | * | 4/1997 | Washino et al. ............. 348/154 |
| 5,701,383 A | | 12/1997 | Russo et al. |
| 5,790,114 A | * | 8/1998 | Geaghan et al. ............. 715/763 |
| 5,821,990 A | | 10/1998 | Rudt et al. |

(Continued)

OTHER PUBLICATIONS

Giampaolo, Dominic, Practical File System Design with the Be File System, 1999, Morgan Kaufmann Publishers, Inc., p. 29-30.*

(Continued)

*Primary Examiner* — Hung Dang
(74) *Attorney, Agent, or Firm* — J.A. Lindeman & Co., PLLC (57) ABSTRACT

A data recording and playback system and method with a memory device adapted to receive and temporarily store input signal data as data frames with time stamps, the memory device having addresses associated thereto, and a circular storage buffer having a memory mapped file with same address space as the memory device for storing the input signal data. In one embodiment, an event controller provides an event signal associated to time of an event, and an event processor is provided that copies plurality of data frames stored in the circular storage buffer that have time stamps proximate to the time of the event. Another embodiment is adapted to allow playback of stored input signal data from the circular storage buffer without interrupting simultaneous recording of new input signal data into the circular storage buffer.

38 Claims, 8 Drawing Sheets

| File Size | Size of the file in bytes |
|---|---|
| Maximum Frame Index | Last frame in buffer |
| Maximum Frame Size | Space allocated for largest frame size |
| Average Frame Size | Running average of all frames in buffer |
| Frame Rate | Rate at which the frames are digitized |
| Head Frame | Position in the file of the head frame |
| Tail Frame | Position in the file of the tail frame |
| Format Size | Size of the following format description block |
| Format 1 | Format descriptor of frame data |
| ... | ... |
| Format 128 | |
| Frame 1 Header: Time Stamp | Time of data capture |
| Frame 1 Header: Page | Virtual memory page boundary |
| Frame 1 Header: Offset | Offset from frame virtual memory page boundary to data header |
| Frame 1 Header: Size | Size of the data block |
| Frame 1: Frame Data | Data block |
| ... | |
| Frame n Header: Time Stamp | . |
| Frame n Header: Page | . |
| Frame n Header: Offset | . |
| Frame n Header: Size | . |
| Frame n: Frame Data | . |

(56) References Cited

U.S. PATENT DOCUMENTS

| | | | |
|---|---|---|---|
| 5,845,240 A | | 12/1998 | Fielder |
| 6,035,367 A | * | 3/2000 | Laws .......................... 711/100 |
| 6,101,198 A | | 8/2000 | Koenig et al. |
| 6,163,338 A | * | 12/2000 | Johnson et al. ............. 348/148 |
| 6,233,389 B1 | * | 5/2001 | Barton et al. ................. 386/46 |
| 6,542,198 B1 | * | 4/2003 | Hung et al. ................... 348/459 |

OTHER PUBLICATIONS

Giampaolo, Dominic, Practical File System Design with the Be File System, 1999, Morgan Kaufmann Publisheders, Inc. p. 29-30.*

* cited by examiner

| | |
|---|---|
| File Size | Size of the file in bytes |
| Maximum Frame Index | Last frame in buffer |
| Maximum Frame Size | Space allocated for largest frame size |
| Average Frame Size | Running average of all frames in buffer |
| Frame Rate | Rate at which the frames are digitized |
| Head Frame | Position in the file of the head frame |
| Tail Frame | Position in the file of the tail frame |
| Format Size | Size of the following format description block |
| Format 1 | Format descriptor of frame data |
| ... | ... |
| Format 128 | |
| Frame 1 Header: Time Stamp | Time of data capture |
| Frame 1 Header: Page | Virtual memory page boundary |
| Frame 1 Header: Offset | Offset from frame virtual memory page boundary to data header |
| Frame 1 Header: Size | Size of the data block |
| Frame 1: Frame Data | Data block |
| ... | |
| Frame n Header: Time Stamp | . |
| Frame n Header: Page | . |
| Frame n Header: Offset | . |
| Frame n Header: Size | . |
| Frame n: Frame Data | . |

DATA RECORDING AND PLAYBACK SYSTEM AND METHOD

This application claims priority to U.S. Provisional Application No. 60/282,162 filed Apr. 9, 2001, the contents of which are incorporated herein by reference.

BACKGROUND OF THE INVENTION

1. Field of the Invention

The invention generally relates to a data recording and playback systems for monitoring processes or occurrences of events which allows the replay and/or analysis of a time sampled signal.

2. Description of Related Art

Event recording and playback devices used to monitor and record events typically fall into one of two types. VCR and tape recording type devices permit the recording of a video and/or other signal and allows later playback of these signals. Other recording and playback devices utilize a circular storage buffer during recording in which recent data over-writes the older data. For instance, U.S. Pat. No. 6,035,367 to Laws discloses a computer file system having looped file structure for data collection of asynchronous events. Thus, Laws reference describes a system that records to a circular storage buffer. However, the system described in Laws terminates recording when a predetermined event occurs.

Other known devices for event recording and playback maintain a circular storage buffer of recorded signal in the manner described above and respond to an event or a trigger by transferring the contents of the circular storage buffer to an intermediate storage location based on predetermined pre-trigger and post-trigger times. U.S. Pat. No. 6,136,338 to Johnson, et al., U.S. Pat. No. 5,845,240 to Fielder, and U.S. Pat. No. 5,821,990 to Rudt, et al. each describe such event recording and playback systems that utilize a circular storage buffer which either stops recording upon the occurrence of an event, or extracts the data related to the event and stores the data at an intermediate storage location as a plurality of sequential files, each file containing a very small time duration. After the data related to the event is extracted and stored, playback of the recorded data is made possible by retrieving the stored data from the intermediate storage location. However, these technologies do not allow simultaneous recording and playback of these signals.

The recording of data signals using circular storage buffers are also known in consumer electronics products as well. Such known consumer products include devices manufactured by TiVo® and ReplayTV® which are designed to record broadcast video. Such devices have a live TV mode in which they simultaneously record and playback television broadcasts from a circular storage buffer. U.S. Pat. No. 5,701,383 to Russo, et al., and U.S. Pat. No. 5,371,551 to Logan et al. describe such consumer television type systems. In particular, Logan et al. discloses a time delayed digital video system that utilize concurrent recording and playback that is implemented by a subsystem digital memory where semiconductor RAM memory and a disk memory are operated by a microprocessor such that incoming signals are constantly recorded as received while, at the same time, delayed signals are being read from the memory subsystem at a different memory location selected by the microprocessor to provide a user-selected time delay.

However, the technology used in the above described consumer devices do not interface to external events. In other words, these consumer devices are not associated to a triggering event but are merely operated to begin collection of data at a particular time. In addition, such time delaying consumer systems are implemented utilizing proprietary hardware architectures and internal programming. Consequently, the known consumer devices cannot be readily used to monitor external events and to record and playback such monitored events.

Furthermore, such proprietary hardware architectures and internal programming are not readily transferable to event recording and playback devices described above which are typically implemented using a programmable computer such as personal computers, servers, or the like. In particular, it is desirable to provide an event recording and playback system that is flexible enough to be readily adapted for application in different environments and to receive information from a variety of monitoring sensors. For instance, depending on the particular application, variety of sensors such as vision cameras, audio sensors, vibration sensors, thermal sensors, and the like may be used, individually, or in combination. Therefore, a computer based implementation of the event recording and playback devices is desirable since such computers provide the flexibility to be adapted for various applications.

Current computer based video recording and playback systems such as those suggested in the reference Rudt et al. and Fielder have significant limitations and disadvantages in that the event data captured and stored in the intermediate storage location cannot be easily viewed. Each of the plurality of files stored in the intermediate storage must be retrieved and viewed. Alternatively, two or more of the files may be retrieved and combined to provide a more continuous playback of a longer time interval. However, it is often desirable for the user of the event recording and playback device to quickly view or otherwise access the stored data for a segment of time monitored, and to quickly move on to another segment of time monitored. Having to retrieve one or more of the plurality of files that are stored in the intermediate storage location, and/or to compile a plurality of files is cumbersome and time consuming.

Therefore, there exists an unfulfilled need for a data recording and playback system for monitoring processes or occurrences of events which avoids the disadvantages of the prior art. In particular, there exists an unfulfilled need for such a data recording and playback system that allows easy and rapid viewing of the recorded data.

SUMMARY OF THE INVENTION

In addition to the above discussed disadvantages, in evaluating computer based data recording and playback systems, the present inventors have realized that such prior art systems yielded temporal and video resolutions which are inadequate to observe real-time processes and/or events which often occur instantaneously and intermittently. In particular, many monitored events may occur in less than a 200 millisecond time interval over a prolonged interval of many hours. However, the present inventors uncovered that if there are other instructions being executed by the processor of the computer at that particular instant in time when the event occurs, or if the computer's bus causes even an instantaneous delay in transferring the required instructions, the event may not be captured by the data recording and playback system. This limitation is manifested as "dropped frames" which are frames of real-time data which have not been captured and stored into the circular storage buffer. Because dropped frames are not recorded, such frames are lost forever and thus, processes or events which occurred during the dropped frames cannot be retrieved at a later time resulting in the loss of potentially very critical data.

The present inventors have found that typical reasons for dropped frames in computer implemented data recording and playback systems are inadequate disk bandwidth, and multitasking operating system time slice starvation. In such situations, the task which enters the frames into the buffer cannot accept the next frame from the digitized video input before the next frame arrives. It has been found that limitations on disk file size, multi tasking, and file access times all limit both the resolution and duration of the circular storage buffer that can be maintained while minimizing dropped frames.

In addition, the present inventors found that the previously discussed limitations and disadvantages of prior art data recording and playback systems in which plurality of files stored in the intermediate storage location must be retrieved and/or compiled exacerbates the likelihood that there will be additional dropped frames when the data recording and playback system is implemented via a computer. More specifically, as the operator retrieves and/or compiles the files stored in the intermediate storage location, the resources of the processor and the bus of the computer become occupied and likelihood of delays in executing instructions to record and store the data into the intermediate storage location increases thereby resulting in the increased likelihood of dropped frames.

Thus, in the prior art data recording and playback systems, processor, bus speeds, and design do not provide enough reliability in execution of such instructions and delays, and correspondingly, dropped frames, become inevitable if the resources of the computer implemented data recording and playback system is at all diverted during data recording. This effectively precludes the operator of the data recording and playback system from viewing the stored data at the same time as when data is being recorded.

Therefore, there exists a further need for a data recording and playback system that also allows the analysis and/or replay of a time sampled signal while minimizing the likelihood of dropped frames.

In view of the above, one advantage of the present invention is in providing a data recording and playback system that allows easy and rapid viewing of the recorded data.

In addition, the present invention also has the advantage of providing a data recording and playback system that allows the analysis and/or replay of a time sampled signal.

Furthermore, the present invention further has the advantage of providing such a data recording and playback system that minimizes the likelihood of dropped frames.

These and other advantages are attained by a data recording and playback system in accordance with one embodiment of the present invention having a monitoring device that provides an input signal data, a memory device adapted to receive and temporarily store the input signal data from the monitoring device as data frames with time stamps, the memory device having addresses associated thereto, and a circular storage buffer having a memory mapped file with same address space as the memory device, the circular storage buffer being adapted to receive the temporarily stored input signal data from the memory device, and to store the input signal data in the memory mapped file.

In accordance with the preferred embodiments, the circular storage buffer stores recent data frames over aged data frames in the memory mapped file. The memory device may be a random access memory of a computer. In this regard, the circular storage buffer may be provided on at least one hard disk drive of the computer and the input signal data stored in the memory device storage buffer is transferred to/from a file system.

One embodiment of the data recording and playback system also includes an event controller that provides an event signal associated to time of an event. An event database is provided for storing event signal data, and an event processor is provided that copies a plurality of data frames stored in the circular storage buffer that have time stamps proximate to the time of the event into additional secondary memory mapped files, each containing a single event, indexed from the event database. An access controller may be provided which is adapted to retrieve the plurality of data frames that have time stamps proximate to the time of the event from the event database, the event database being provided in at least one hard disk drive of a computer in one embodiment. The access controller may be connected to a network to allow remote access thereof. In such an embodiment, the system may be provided with at least one client device connected to the network, the client device such as a computer being adapted to remotely control the access controller. In this regard, the client device may include a display device for displaying the plurality of data frames copied from the circular storage buffer.

The data recording and playback system may also be provided with a digitizer that digitizes the input signal data when the input signal data is an analog signal. The present invention may be especially advantageously used to record and playback video and audio signals. If the input signal data contains redundant information, a compressor may be provided to compress the input signal data prior to storage in the circular storage buffer. The memory mapped file in accordance with one embodiment of the present invention is adapted to allow playback of stored input signal data from the circular storage buffer without interrupting simultaneous recording of new input signal data into the circular storage buffer.

In accordance with other aspects of the present invention, a method of recording and playback of data is provided. Moreover, a computer executable software for implementing the system and method of the present invention is also disclosed.

These and other advantages and features of the present invention will become more apparent from the following detailed description of the preferred embodiments of the present invention when viewed in conjunction with the accompanying drawings.

DETAILED DESCRIPTION OF THE INVENTION

As will be evident from the discussion below, the present invention provides a data recording and playback system that avoids the disadvantages of known data recording and playback systems by allowing easy and rapid viewing of the recorded data, and allowing analysis and/or replay of a time sampled signal. In addition, it should also be evident from the discussion below that the present invention further avoids a significant limitation of prior art devices by providing a data recording and playback system that minimizes the likelihood of dropped frames.

Figure 1:
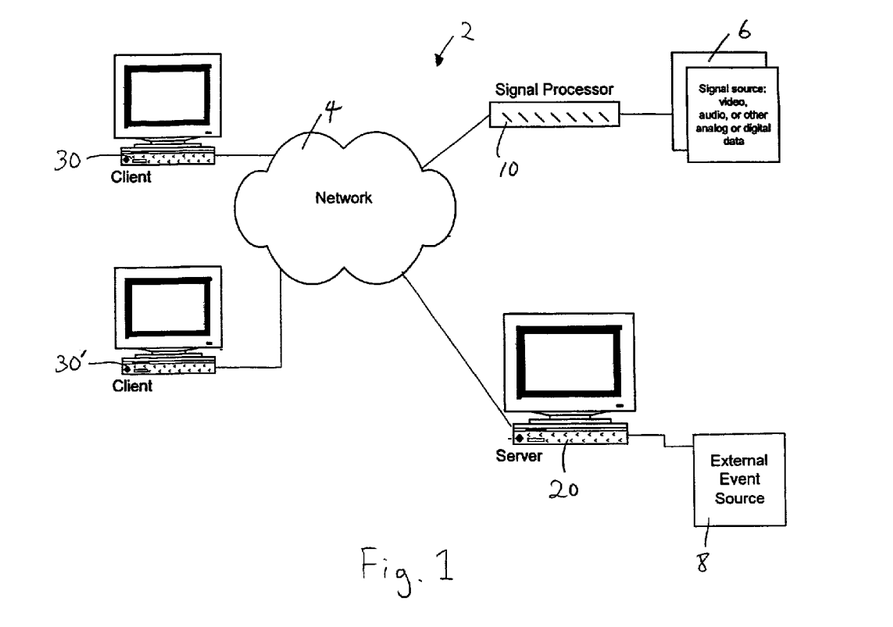
FIG. 1 is a schematic illustration of a data recording and playback system in accordance with one embodiment of the present invention which is implemented through a network.

FIG. 1 is a schematic illustration of a data recording and playback system 2 in accordance with one embodiment of the present invention which is implemented through a network 4. The network 4 may be any type of a network such as a local area network, wireless network, wide area network, or the Internet. It should, however, be noted that whereas the illustrated embodiment of the data recording and playback system 2 described in detail below is implemented via network 4, in other embodiments, the data recording and playback system of the present invention may also be implemented in a single computer with components for performing the functions of various devices described with respect to the network implemented embodiment. In such a single computer implementation, the computer system bus may be considered to be the network of the data recording and playback system and thus, falls within the scope of the present invention.

The illustrated embodiment of the data recording and playback system 2 includes a signal processor 10 connected to a monitoring device 6. The monitoring device 6 may be any type of a device for monitoring such as a video camera, microphone, a sensor, etc, that functions as a signal source for providing an input signal data to the signal processor 10. For instance, the monitoring device 6 would provide a video, audio, or other type of time sampled signal respectively for the various examples noted. The data recording and playback system 2 also includes a server 20 that controls and maintains the databases of the data recording and playback system 2 in the manner further described below.

In addition, the server 20 is also connected to an external event source 8 that provides an event signal to the server 20, the event signal being associated to an external event. The event source 8 may be a logic pulse generated by an independent system which indicates that an important event has occurred. The external event source 8 may also be a sensor used in conjunction with the monitoring device 6 that provides an event signal when sensor is actuated, the actuation of the sensor only occurring when the triggering external event occurs. In this regard, the external event source 8 may also be a processor in another embodiment which analyzes the input signal data to determine whether an event has occurred, and provides an event signal when an event is determined to have occurred.

Furthermore, the data recording and playback system 2 in accordance with the illustrated embodiment of FIG. 1 is provided with client devices 30 and 30' that are remotely located to allow users of the data recording and playback system 2 to access the recorded data in the manner further described below. In the above regard, each of the noted components of the data recording and playback system 2 and their operation are described herein below.

Figure 2:
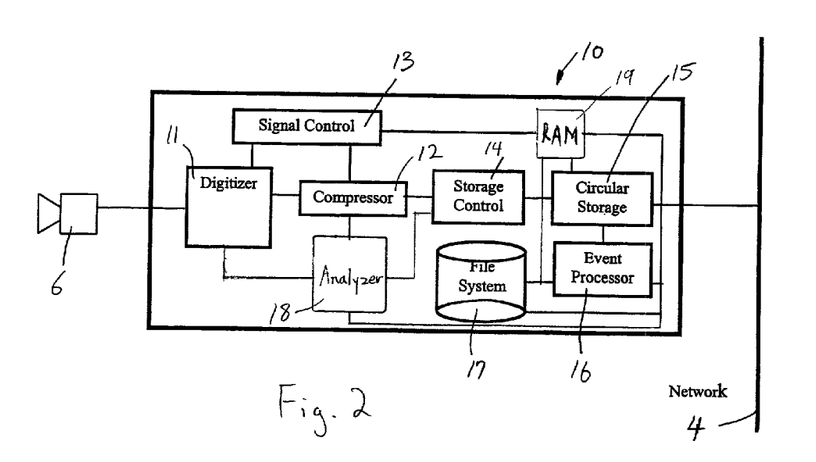
FIG. 2 is a schematic illustration of one embodiment of a signal processor that may be used in implementing the data recording and playback system of the present invention.

FIG. 2 shows a schematic illustration of the signal processor 10 in accordance with one embodiment of the present invention. As can be seen, the signal processor 10 is in communication with monitoring device 6 that provides an input signal data to the signal processor 10 such as a video, audio or other type of signal. The signal processor 10 includes a digitizer 11 which receives the input signal data from the monitoring device 6, and digitizes the signal data if the input signal data is an analog signal. Of course, if the signal is already in digital form, the digitizer 11 is bypassed. As previously noted, the signal may be a video signal, an audio signal, or other signals that may be in analog or digital form. In other embodiments, the input signal data may be a vibrational signal, optical light signal, etc., and correspondingly, may be provided by an appropriate monitoring sensors or devices.

Depending on the nature of the input signal data provided by the monitoring device 6, if the digitized input signal data is highly repetitive or redundant, a compressor 12 compresses the input signal data by applying an appropriate compression algorithm known in the art to reduce the storage requirements for the input signal data. For instance, if the monitoring device 6 is a video camera which provides a video signal, the video signal may be compressed using the known video compression algorithms MJPG or MPEG, for example. Of course, in cases when the compression of the signal data is not appropriate, the compressor 12 is bypassed so that the input signal data is not compressed.

The signal control 13 sets the sample rate and gain of the digitizer 11, and also sets the compression parameters for the compressor 12. In addition, the signal control 13 accesses the data access control of the server 20 discussed in further detail below to retrieve these configuration parameters. The signal processor 10 in accordance with one preferred embodiment of the present invention, may be implemented on a computer with a video frame capture and a compressor card, the details of which are known in the art and therefore, omitted here.

The analyzer 18 applies various pattern recognition algorithms automatically to the data from the digitizer 11 or the compressor 12 to identify any deviations form normal behavior of the signal from monitoring device 6 that may be of interest. For instance, in the case of an audio signal the analyzer may trigger an event on the sudden change of amplitude, or in the case of a video signal, on the statistically significant change in brightness or contrast. More sophisticated analyses can be performed that trigger an event when the nature of the signal matches a reference signal. The analyzer 18 passes analysis data about each frame to the storage control 14 for storage in the circular storage buffer 15, the details of which is described below. Once the analyzer 18 triggers an event, it sends a message to the event control 22 with the time stamp and other analysis data to initiate the event capture processing.

The storage control 14 provided in the signal processor 10 receives the digitized and/or compressed input signal data from the monitoring device 6, and stores the input signal data and the analysis data in the circular storage buffer 15 together with a time stamp for each record. In this regard, the circular storage buffer 15 has two unique positions, the head and tail. The head represents the position in the circular storage buffer 15 having the most recent signal data, and the tail position represents the position in the buffer having the oldest signal data that is leaving the circular storage buffer 15, i.e. being overwritten by the most recent signal data. The circular storage buffer 15 is preferably implemented as a memory mapped file. As such, the input signal data is swapped between the RAM 19 and file system 17 as needed.

In this regard, the input signal data from the monitoring device 6 is stored as data frames into the circular storage buffer 15 by the storage control 14. The signal processor 10 also includes an event processor 16 that is adapted to extract data frames starting from a data frame that is a predetermined number of data frames before the external event time provided by the server 20 as described in further detail below, and ending a predetermined number of data frames after the external event time. The extracted data frames are then stored in file system 17 thereby providing a permanent record of the data frames before, during, and after the event prior to the data frames being overwritten in the circular storage buffer 15 by more recent data frames. In addition, the event processor 16 of the present embodiment is also adapted to mark the input signal data being stored in the circular storage buffer 15 when an event occurs to thereby flag the location of an occurrence of an external event in the circular storage buffer 15, signal to mark the input signal data being provided by the event processor 16.

Figure 3:
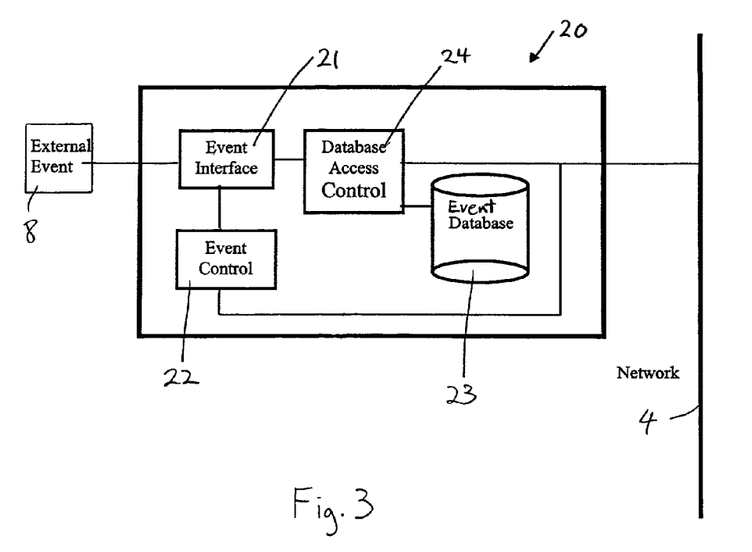
FIG. 3 is a schematic illustration of one embodiment of a server that may be used in implementing the data recording and playback system of the present invention.

FIG. 3 shows a schematic illustration of a server 20 that may be used in the data recording and playback system 10 in accordance with one embodiment. As shown in FIG. 1, the server 20 is connected to an external event source 8 which provides an event signal that notifies the server 20 that an external event of interest has occurred. As previously described, the external event source 8 may be a sensor or a processor used in conjunction with the monitoring device 6. The external event source 8 provides the event signal to event interface 21, the details of the event interface 21 depending on the type of event signal provided. In one embodiment, the event interface 21 may be an external relay closure or applied voltage level that is used to cause a serial port interrupt. In more sophisticated embodiments of the event interface 21, serial, TCP/IP or FTP protocols can be implemented that transfer additional data as well. Therefore, in accordance with the illustrated embodiment, the event signals are additional inputs to the data recording and playback system that are not stored continuously, but are used to indicate the occurrence of an important event. Further in this regard, the event signals may be initiated manually by the user of the data recording and playback system 10 as well using an input device such as a keyboard, mouse, etc. so that a particular data frame in the circular storage device may be manually marked.

The event control 22 of the server 20 determines the time in which the event signal is received from the external event source 8 and stores this time stamp associated to the external event in event database 23. In addition, in alternative embodiments where more sophisticated interfaces are used, the additional data provided by such interfaces is also stored in the event database 23 by the event control 22.

The server 20 of the illustrated embodiment of FIG. 3 also includes a database access control 24 that regulates access to the event database 23, and allows accessing of the time stamp stored in the event database 23 when queried in the manner described in further detail below. Moreover, the event control 22 of server 20 sends an event signal via the network 4 to the event processor 16 of the signal processor 10 to mark the input signal data being stored in the circular storage buffer 15 as the external event is detected. In addition, the event signal sent by the event control 22 of the server 20 to the event processor 16 of the signal processor 10 may also be used to trigger the event processor 16 to extract the signal data from the circular storage buffer, and to store the data frames into the file system 17 in the manner previously described, the data frames extracted preferably including those immediately before, during, and immediately after the time of the event. As previously noted, the event database 23 may further be utilized to store system configuration information such as the names of input signal data, various parameters for the digitizer 11, compressor 12, and the circular storage buffer 15, as well as computer names and event data.

Figure 4:
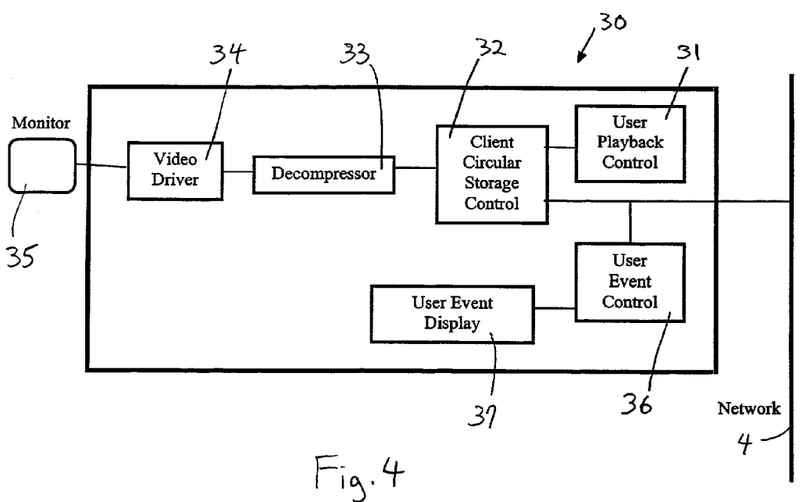
FIG. 4 is a schematic illustration of one embodiment of a client device that may be used in implementing the data recording and playback system of the present invention.

FIG. 4 is a schematic illustration of the client device 30 that may be used to implement the data recording and playback system 2 of FIG. 1. It should be appreciated that whereas only the client device 30 shown in FIG. 1 is described in detail hereinbelow, client device 30' may also be implemented in a similar manner. The primary function of the client device 30 is to playback the data frames from the signal processor 10 with event annotation from the server 20 so that the signal data may be viewed and analyzed by the user of the data recording and playback system 2. In this regard, the client 30 is provided with user playback control 31 which may be used to specify numerous playback parameters such as the position of the circular storage buffer 15 to be played back, to specify the event to be played back from event database 23, and to specify the direction and speed of the playback.

The client circular storage control 32 receives the playback commands provided by the user playback control 31, and receives the signal data from the circular storage buffer 15 of the signal processor 10 or from previously saved event files stored in the file system 17. The retrieved signal data is provided to the decompressor 33 which reconstructs a close representation of the original event signal. If the original event signal was not compressed, then the decompressor 33 is bypassed. The signal data is then provided to a suitable driver, for example, video driver 34 for video signals that reconstructs the signal data appropriately. The video driver 34 then displays the reconstructed signal data on a playback device such as monitor 35 in the embodiment where the input signal data is a video signal. Of course, it should be appreciated that in other embodiments where the input signal data is a different type of signal, reconstruction is appropriately done and provided to an appropriate driver. In the illustrated embodiment of FIG. 4, the client 30 is also provided with a user event control 36 which can be used to initiate a manual event as previously described. In this regard, user event display 37 may be provided to command the client storage control 32 to show the selected event and to show the time stamp and any additional data associated with the events being monitored.

Figure 5:
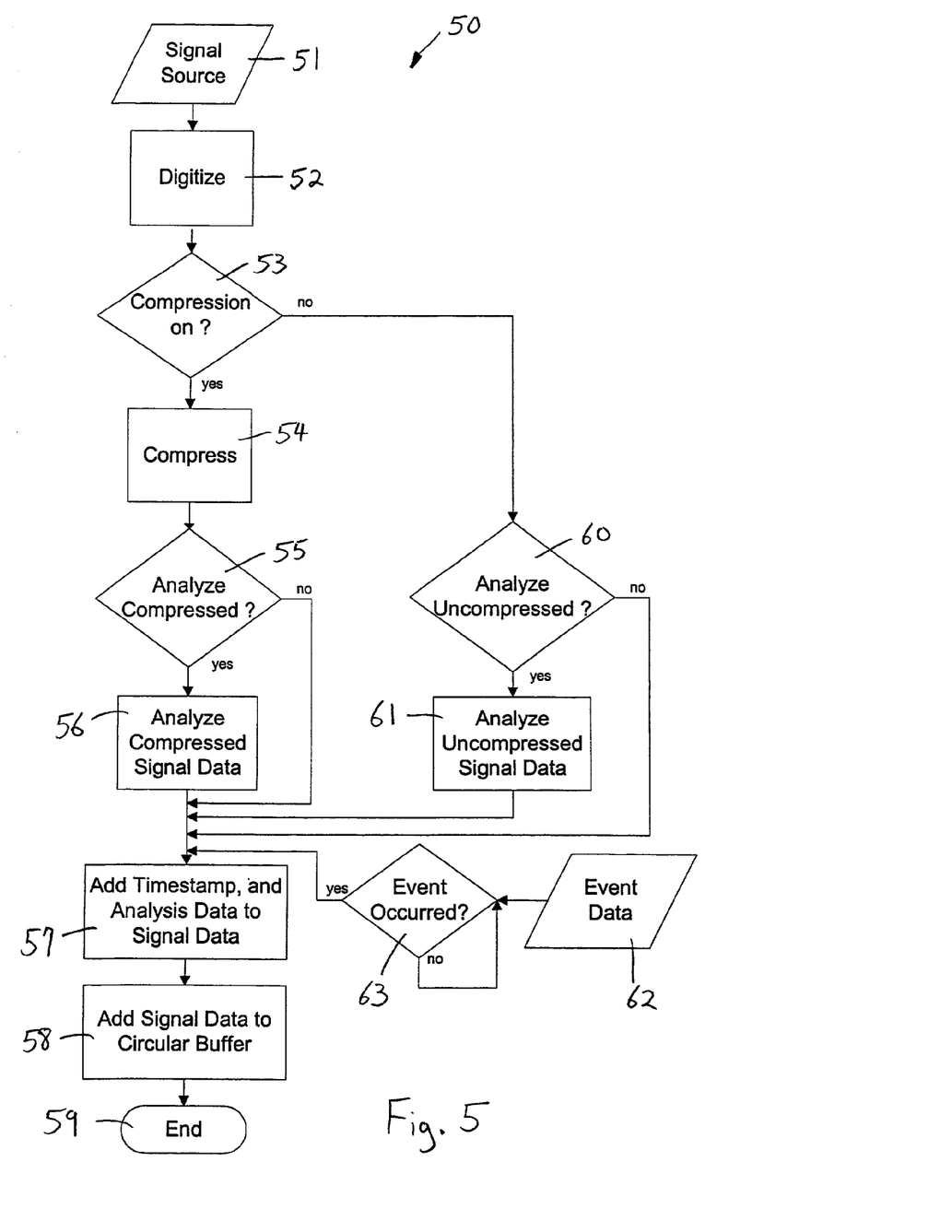
FIG. 5 is a logical flow diagram of how the signal processor of FIG. 2 may be operated.

FIG. 5 shows a logical flow diagram 50 illustrating how the signal processor 10 of FIG. 2 may be operated in accordance with one embodiment of the present invention. In this regard, the operation of the signal processor 10 is described in the context of the illustrated implementation of FIGS. 1, 2, 4, and thus these figures should also be referenced for clarity. The signal source shown in block 51 is provided by the monitoring device 6 and is digitized in block 52 by digitizer 11 shown in FIG. 2. If the compressor 12 is "on" as shown by the decision block 53, the signal data is compressed as shown in block 54. A determination is made in block 55 whether the signal data is to be analyzed in its compressed form. If so, the compressed signal data is analyzed as indicated by block 56. Otherwise, if the signal data is not to be analyzed, the analysis block 56 is bypassed. A time stamp and any analysis data is added to the signal data in block 57 and stored in the circular storage buffer 15 in block 58, the logical flow ending in block 59.

If compression was "off" and the signal data provided by the monitoring device in block 51 was not to be compressed, a determination is made whether the signal data needs to be analyzed in its uncompressed form in decision block 60. If the uncompressed signal data is to be analyzed, the data is analyzed in block 61, and time stamp as well as the analysis data is added to the signal data in block 57 thereafter. Then the signal data is added to the circular storage buffer 15 as shown in block 58, the logical flow ending in block 59. If the uncompressed data is not to be analyzed, the analysis step of block 61 is bypassed as shown.

In addition, events data provided by the server 20 as indicated in block 62 is monitored in block 63 so that upon determination of an occurrence of an event, such information is added together with a time stamp and analysis data to the signal data in block 57. Again, the signal data is added to the circular storage buffer in block 58 and the process is ended in block 59. Thus, the signal processor 10 performs an important function of time stamping the data frames and storing the data frames with the time stamp and any other associated data in the circular storage buffer 15 when an event occurs as illustrated by block 63.

Figure 6:
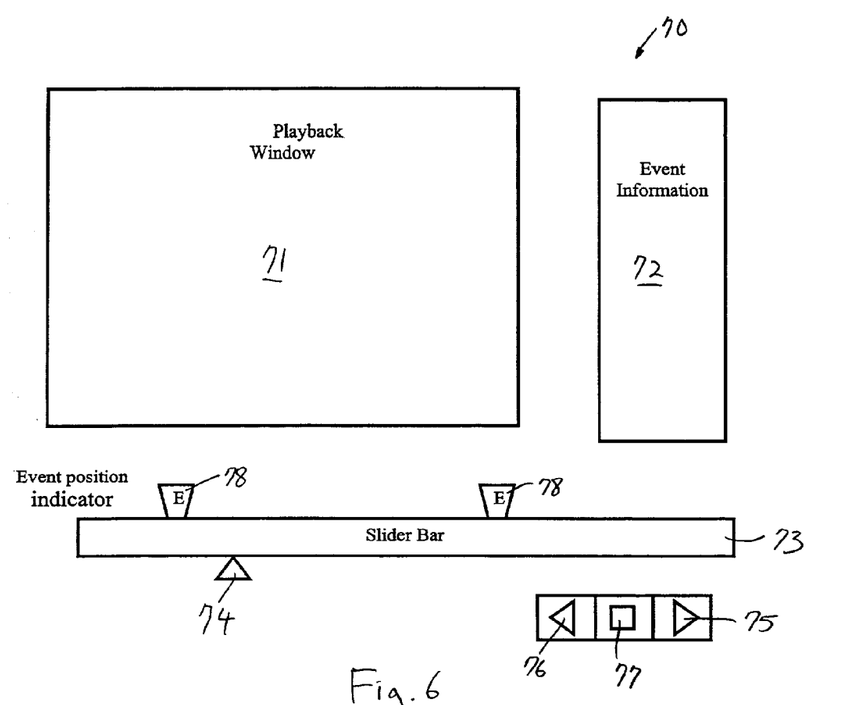
FIG. 6 is a schematic illustration of a graphical user interface which may be used to interface with the data recording and playback system.

FIG. 6 shows one embodiment of a user playback control screen 70 which may be provided to or by the client computers 30 and 30' of FIG. 1 that allows a user to control and interface with the data recording and playback system 2. The playback control screen 70 is provided with a video playback window 71 for graphically displaying the retrieved data frames from the circular buffer 15 or the file system 17 of the signal processor 10. It should be evident that if the input signal data was video signals, the reconstructed video frames may be displayed in the playback window. However, if the input signal data was a different type of signal, for instance, an audio signal, characteristics of that signal such as its frequency and decibel may be displayed. Of course, other type of signal characteristics may be displayed depending on the input signal data. In addition, event information window 72 of the playback control screen 70 may be used to list the plurality of events and the time associated thereto as provided by the event database 23 of the server 20.

To allow the user of the data recording and playback system to easily retrieve and playback the recorded data, the playback control screen 70 of the illustrated embodiment is also provided with a slider bar 73 that represents the circular storage buffer 15. In the above regard, the head and tail are considered as real time positions where the data frames stored in the circular storage buffer 15 are outputted to the user. At other positions in the circular storage buffer 15, the user can request the data frames stored in a particular position to be played back in the manner discussed below. The playback control screen 70 is also provided with a pointer 74 which indicates the exact position of the circular storage buffer 15 that is presently being reconstructed and displayed in the playback window 71. The user of the data recording and playback system 10 can control the data frames being played back in the playback window 71 by controlling the position of the pointer 74 along the slider bar 73. This may be obtained by clicking and dragging the pointer 74 along the slider bar 73, again, the position of the pointer 74 corresponding to the position of the data frame being displayed in the circular storage buffer 15 of the server 10.

Furthermore, a forward button 75 and a reverse button 76 are provided to allow the user to designate the direction of the playback, i.e. forward in time or backward in time. In addition, stop button 77 may be used to stop playback in the playback window 71. As can also be seen, the slider bar is marked by event position indicators 78 and 79. These event position indicators 78 and 79 mark the position along the slider bar 73 where an event has occurred and is stored in the circular storage buffer 15 of the signal processor 10. In this regard, the event position indicators 78 and 79 may be generated by identifying the time stamps corresponding to event signals stored in the event database 23. The corresponding information may also be displayed in the event information window 72, the displayed event information serving as embedded links to playback the respective data frames associated to the event.

Figure 7:
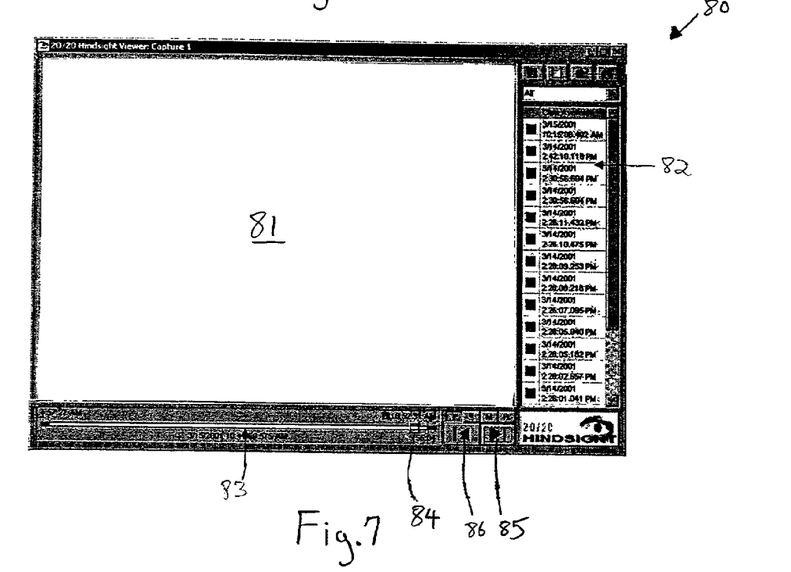
FIG. 7 is a screen shot of a computer implemented graphical user interface of FIG. 6.

FIG. 7 shows an example playback control screen which has been implemented as a computer window screen 80. As can be seen, the window screen 80 is provided with a playback window 81 that displays the reconstructed data frames, and an event information window 82 which lists the events that may be viewed the user, the listed events serving as embedded links to playback the respective data frames associated to the event. In addition, a slider bar 83 is provided toward the bottom of the window screen 80 with a pointer 84 that may be moved to view the desired data frame stored in the circular storage buffer in the manner discussed relative to FIG. 6. In addition, forward and reverse buttons 85 and 86 may be provided to allow control of the direction of playback. Of course, it should be appreciated that the illustrated window screen 80 is merely one example of how the user interface may be implemented and other implementations having differing interfaces may be used instead in accordance with the present invention.

Figure 8:
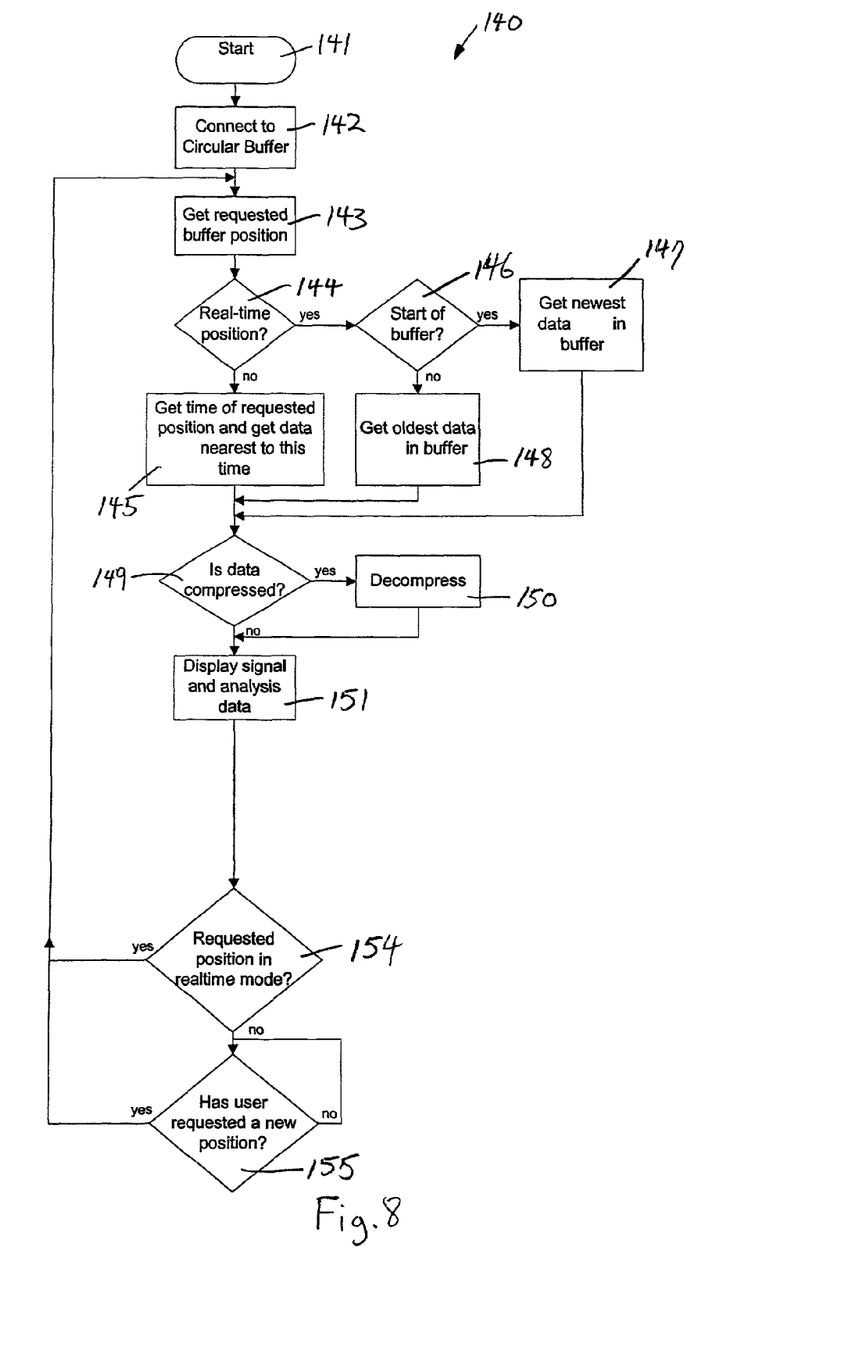
FIG. 8 is a logical flow diagram of how the data recording and playback system of the present invention may be operated in accordance with one embodiment.

FIG. 8 illustrates a logical flow diagram 140 illustrating the operation of the data recording and playback system in accordance with one embodiment of the present invention. The user begins interfacing with the data recording and playback system in block 141 via playback control screen such as that described above, for instance, so that the user interface to the circular storage buffer as shown in block 142. The user requested buffer position is obtained in block 143. A determination is made in decision block 144 whether the data frames requested for playback is a real time position, i.e. at the head or tail of the circular storage buffer, or a stored position in the circular storage buffer. If a stored position is requested, the time of requested position is obtained and predetermined number of data frames nearest to this time are also retrieved in block 145.

If in fact, a real time position was requested in block 144, a determination is made whether the start (i.e. head) of the buffer is requested or the end (i.e. tail) of the buffer is requested in block 145. If the start of the buffer is requested, then the newest data frame in the buffer is provided in block 147. Otherwise, the oldest data frame in the buffer is provided in block 148. A determination is then made as to whether the signal data is compressed in decision block 149. If the signal data is compressed, it is decompressed in block 150. Otherwise, the decompression step is bypassed. The signal data and any associated analysis data is displayed to the user in block 151. A determination is then again made as to whether the requested position is in real time mode in block 154. If the requested position is in real time mode, then the above-noted logic flow is repeated from block 143. If the requested position was not in real time mode, a determination is further made as to whether the user has requested a new position in block 155. Until such a new position is in fact requested by the user, upon which the above described logic flow is again repeated.

In the above described manner, the user of the data recording and playback system can view a live stream of the circular storage buffer, either at the head of the buffer which would show the most recent data frames being stored into the circular storage buffer, or at the tail of the buffer which would show the oldest data frames being overwritten by the new data frames as indicated by blocks 144, and 146 to 148 in the above described logical flow diagram 140 of FIG. 8. In addition, the user of the data recording and playback system can retrieve and view any of the data frames stored in the circular storage buffer by requesting viewing of particular position in the circular storage buffer as indicated by block 145 of the logical flow diagram 140. Furthermore, the user of the data recording and playback system can retrieve and view any of the data frames associated with an event, such event being indicated by a marker such as the event position indicator described above relative to the playback control screen 70.

Figure 9:
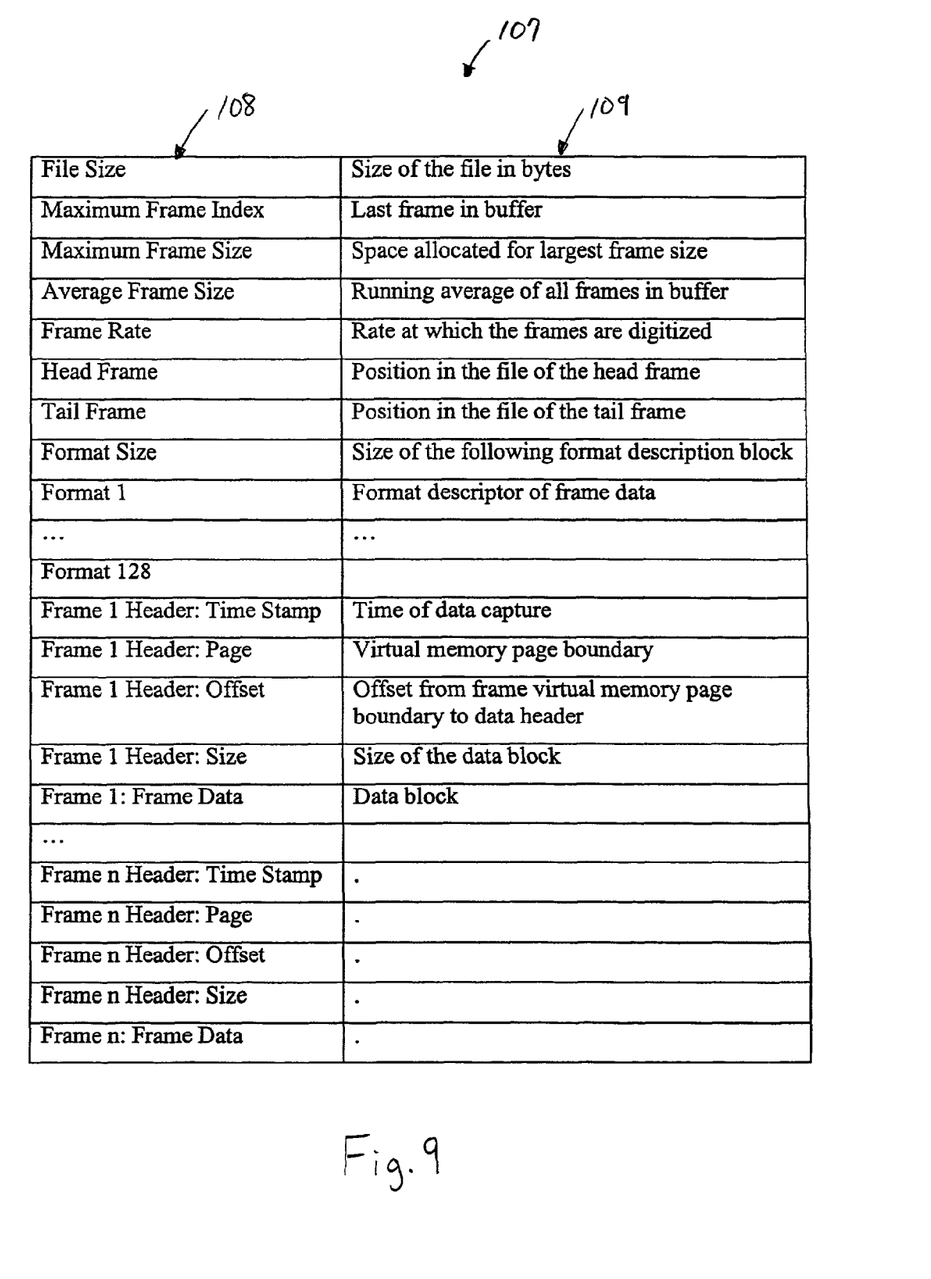
FIG. 9 is a file format table showing the file structure in accordance with one embodiment.

FIG. 9 shows details of a file format in a table 107 suitable for implementing the circular storage buffer 15 of the signal processor 10 in accordance with one embodiment of the present invention. The specific parameters of the file format shown in table 107 are identified in column 108, including data frame header information for data frame 1 to n. Column 109 provides comments expanding upon the various parameters of the file format in column 108. Of course, it should be noted that the circular storage buffer may be implemented using a different file format in other embodiments, and may be tailored to be suitable for a particular type of signal data stored and processed. However, the file format shown in table 107 has been found to be well suited for implementing the circular storage buffer 15 and for storing video data that are made of sequence of frames, each representing an individual image. In this regard, the data frames are implemented as variable size frames of data with fixed size headers. In addition, the size of the circular storage buffer is fixed and has a fixed size file header that points to the beginning (head) and end (tail) of the circular storage buffer data.

Figure 10:
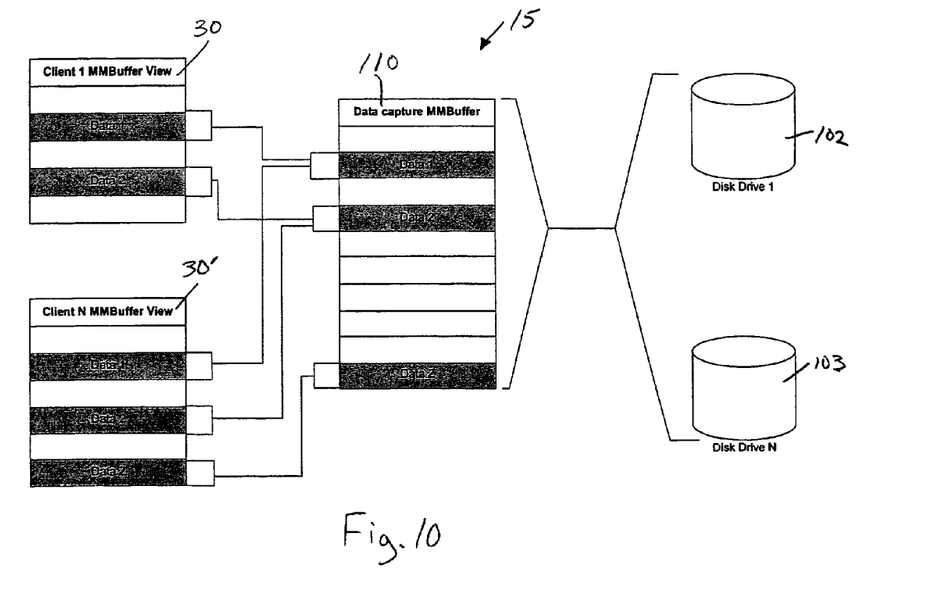
FIG. 10 is a functional schematic illustration of the circular storage buffer interfacing with the client devices.

FIG. 10 shows a functional schematic illustration of the circular storage buffer of the signal processor in accordance with one embodiment of the present invention in which the circular storage buffer is implemented via memory mapped file 110 that is formatted in the manner described above relative to FIG. 9. Initially, it should be noted that the circular storage buffer may be implemented as a reserved area in memory, a disk file, or as a storage in a looped media. As will be discussed in detail hereinbelow, in the illustrated embodiment, circular storage buffer is implemented using a plurality of disk drives 102 and 103. Of course, a single disk drive may be used in other embodiments instead. The memory mapped file 110 has a memory mapped architecture that combines the access speed of the RAM memory with large storage capacity of a disk file. The memory mapped architecture allows the playback from the circular storage buffer to be independent from recording into the buffer so that such recording is uninterrupted by the playback.

In particular, the memory mapped file 110 of the circular storage buffer 15 is mapped in the sense that multiple sections of the file 120 stored on disk drives 102 and/or 103 are mapped to specific ranges of addresses within the RAM 19 of the signal processor 10. The contents of the memory mapped file 110 of the circular storage buffer 15 is accessed by dereferencing the pointer in the designated memory address range. Signal data is written to the memory mapped file 110 of the circular storage buffer 15 by assigning a value to the dereferenced pointer. Signal data movement to and from the disk drives 102 and 103 are handled by lower level caching algorithms that optimize the memory mapped file's 120 access speed to the disk caching hardware such as the disk drives 102 and/or 103. Semaphores may be used to implement data integrity management of the circular storage buffer 15. Such a configuration maximizes access and utilization of the circular storage buffer 15 while minimizing disk latency and performance penalties.

The above implementation of the circular storage buffer 15 with a memory mapped file 110 has the advantage of using the same address pointer access as RAM 19 of the signal processor 10 making the indexing of data in the memory mapped file 110 transparent to the circular storage buffer's 15 access objects. Thus, in essence, a predetermined section of the memory mapped file 110 that is to contain the newest captured signal data is moved from disk drives 102 and/or 103 to RAM 19 of the signal processor 10 having the same address space. The newly captured signal data is then written to RAM 19 of the signal processor 10, which again, is mapped to have the same address space as the memory mapped file 110, thereby allowing rapid capture and transfer of the signal data. When the RAM 19 of the signal processor 10 mapped to the memory mapped file 110 has been filled, the file is unmapped and the signal data is cached to the file system 17. The file system 17 may be implemented as a disk drive or other storage type device.

The memory mapped file implementation of the circular storage buffer is especially advantageous in that it allows the abstraction of the circular storage buffer to a direct pointer virtual address space thereby avoiding issues of switching between Random Access Memory (RAM) and disk files. This enables multiple processes mapped in virtual memory space to read from, and write to the same memory, thereby concurrently sharing the circular storage buffer. Thus, the present system allows the playback from the circular storage buffer without interrupting recording into the circular storage buffer, and significantly reduces the likelihood of dropped frames. Moreover, the "lazy" caching capabilities of the operating system to automatically transfer the memory map contents between memory and disk drive may be used with forced flushing techniques to optimize throughput.

In addition, the implementation of the circular storage buffer 15 utilizing a memory mapped file 110 allows multiple clients such as client 30 and 30' to simultaneously access the circular storage buffer 15 stored in disk drives 102 and/or 103. When the access is across the network, remote objects are created on the signal processor, each with its own RAM allocation that communicate the extracted data to back to the clients. This accessibility by multiple clients is most clearly illustrated in FIG. 11 which shows an example where two client devices are viewing two data frames stored in the memory mapped file 110.

As can be seen, the memory mapped file 110 includes a plurality of data frames 121 stored therein, each data frame having a plurality of pages of data. In the illustrated embodiment of FIG. 11, client device 120 is accessing data frame indicated as "n" while simultaneously, client device 130 is accessing data frame indicated as "n+m". Each of the client devices may utilize a client viewer such as the user playback control screens discussed above relative to FIGS. 6 and 7 to access the specific frame of data, namely data frames n and n+m respectively, by requesting the data frame by the time it was captured.

Figure 11:
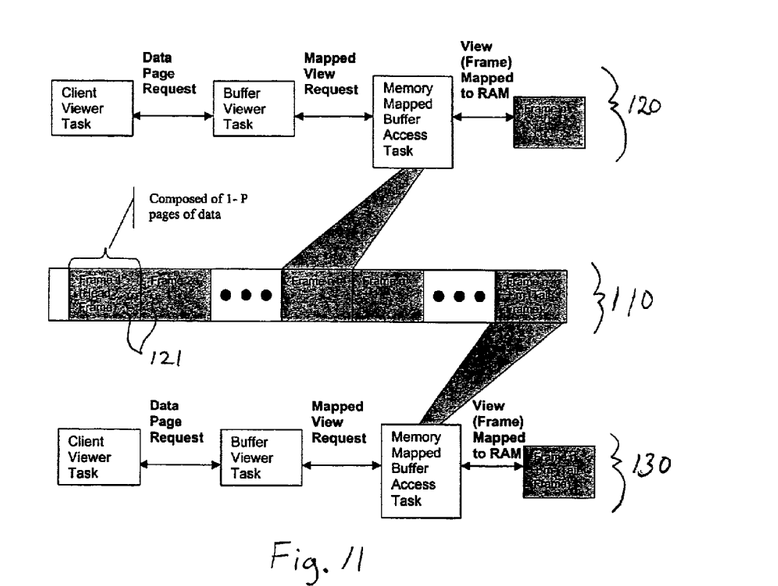
FIG. 11 is a frame by frame illustration of how the circular storage buffer is accessed the client devices.

The client devices 120 and 130 can gain access to circular storage data remotely through buffer access tasks running on the signal processor 10. The buffer access tasks map a "view" of a specific address range of the memory mapped file 110. This view is the only section of the memory mapped file 110 that is moved into addressable memory device. These views have a minimum size set by the virtual memory management of the operating system. This size is sometimes known as the "page" size granularity. Since most operating systems also implement their process virtual memory management as a memory-mapped file, this file is sometimes referred to as the system "paging" file or more commonly as the "swap" file.

Caching of these paged views is preferably intelligent in that the "view" is only written back to the file if it is altered. This caching algorithm is preferably optimized for the page size to minimize the mechanical overhead of the moveable recording head(s) of disk drives. The caching algorithm is also preferably optimized to occur when there is the least performance impact to executing tasks. Because the circular storage buffer is implemented via a memory mapped file 110 which is preferably a single contiguous disk file, reads and writes to adjacent virtual memory locations are insured to be physically adjacent on the disk drive. In this manner, the circular storage buffer cannot become fragmented on the disk drive.

Within the memory mapped file 110, the address of the desired data frame is determined by calculating a byte offset into the circular storage buffer from the number of data frames in the buffer, and the time stamp of the oldest data frame in the buffer. The appropriate data frame is then mapped from this section of the memory mapped file 110 into a memory device, for example, the portion of RAM of the signal processor associated to viewer access task. Only the section of memory necessary to extract the requested data frame from the memory mapped file 110 to RAM is read. This allows support of multiple simultaneous access into the circular storage buffer to allow view of the data frames stored therein. This capability along with the contiguous nature of the circular storage buffer provides the significant performance gains provided by data recording and playback system of the present invention and further allows the present system to playback from the circular storage buffer without interrupting recording into the circular storage buffer.

Figure 12:
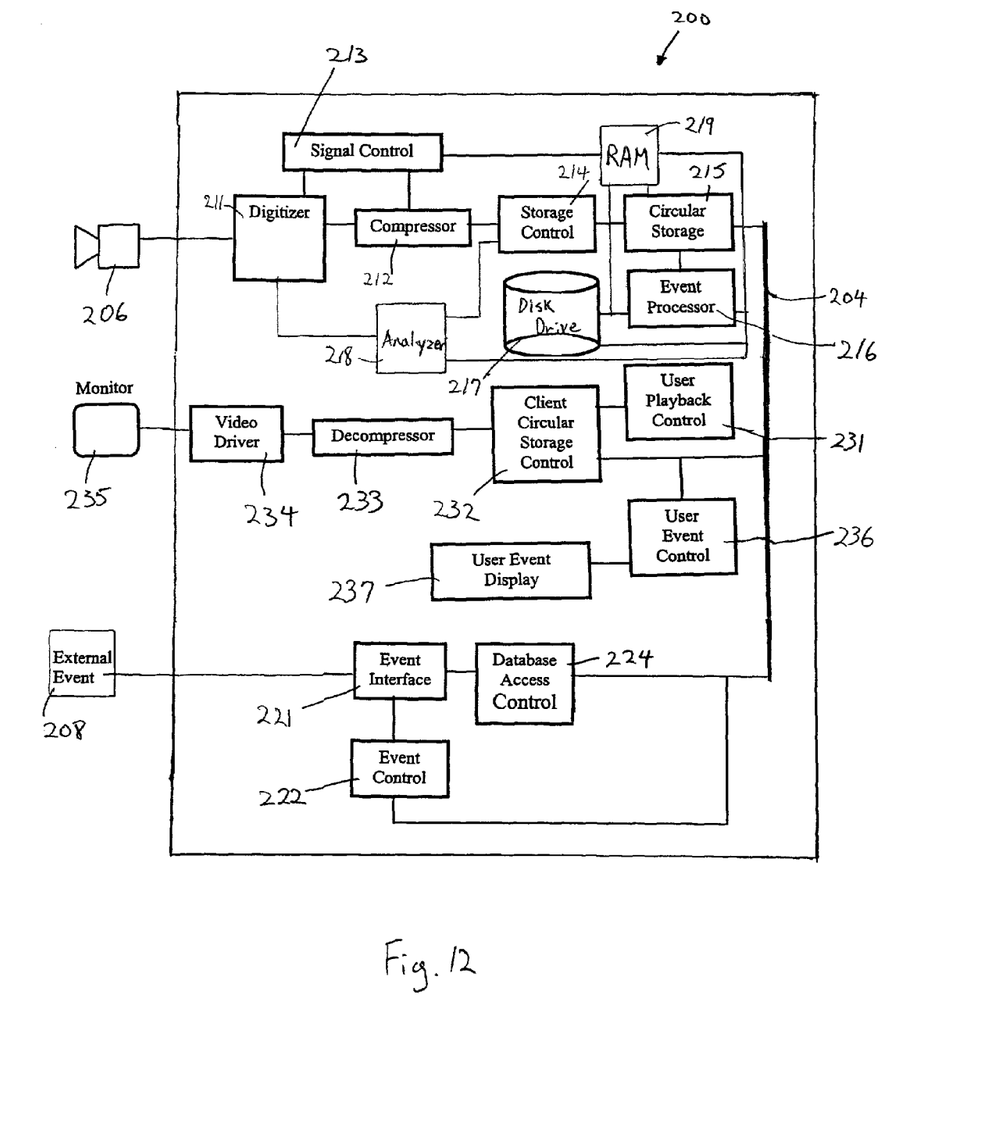
FIG. 12 is a schematic illustration of a data recording and playback system in accordance with another embodiment of the present invention which is implemented in a single stand alone computer.

FIG. 12 shows a schematic illustration of a data recording and playback system 200 in accordance with still another embodiment of the present invention which is implemented in a single, stand alone unit such as a computer. The corresponding components of the data recording and playback system 200 have been enumerated with the same numerals used in FIGS. 2 to 4, except that the numerals are in the 200's.

As can be seen, the data recording and playback system 200 of the illustrated embodiment is in communication with monitoring device 206 that provides an input signal data to a digitizer 211, a compressor 212 that compresses the input signal data, an analyzer 218, a signal control 213, a storage control 214, a circular storage buffer 215, RAM 219, and an event processor 216. The data recording and playback system 200 also includes a disk drive 217 that includes the event database and the file system of the embodiments shown in FIGS. 2 and 3.

The data recording and playback system 200 also includes an event interface 221 connected to an external event source 208, an event control 222, and database access control 224 that regulates access to the event database in the disk drive 217. The data recording and playback system 200 of the illustrated embodiment also includes a monitor 235 connected to a video driver 234 to allow viewing of the stored data frames in the manner previously described. In this regard, a user playback control 231, client circular storage control 232, a decompressor 233, a user event control 236, and user event display 237 may be provided to allow viewing of the stored data frames.

In the illustrated embodiment of FIG. 12 where the data recording and playback system 200 is implemented as a single, stand alone unit, these various components are connected to one another via bus 204 which allows communication between the components and access to data stored in the circular storage 215 and the disk drive 217. The functions and operation of the various components are substantially the same as described relative to FIGS. 2 to 4 with the exception that this embodiment is implemented as a single stand alone unit such as a computer. Consequently, the details of these various components are omitted herein to avoid repetition. In the above described manner, a compact data recording and playback system 200 may be provided that allows easy and rapid viewing of the recorded data, allows analysis and/or replay of a time sampled signal, and minimizes the likelihood of dropped frames. However, the embodiment described previously relative to FIGS. 1 to 4 is especially advantageous since it provides these advantages and also allows remote client devices to view the stored data frames.

In addition, it should be further noted that the above discussed embodiments are only examples of data recording and playback system of the present invention. In this regard, whereas in the particular embodiments discussed above, schematic illustrations were used to identify components associated to a particular function, in other embodiments of the present invention, various components may be used which perform one or more of the identified components. For instance, as noted previously, a disk drive may be used for the file system of the signal processor and the event database. In addition, in the networked embodiment of the present invention as shown in FIGS. 1 to 4, the network allows transfer and access of data utilized and stored by the data recording and playback system of the present invention. Consequently, it should also be evident that the various components of the signal processor, server and client device may be arranged and/or combined in any appropriate manner. Thus, all such variations are also within the scope of the present invention.

Lastly, it should be noted that the disclosed data recording and playback systems and methods described herein can be readily implemented as software executed on a programmed general purpose computer, a special purpose computer, a microprocessor and associated communications equipment, or the like noted above. Furthermore, the disclosed method may be readily implemented in software using object or object-oriented software development environments that provide portable source code that can be used on a variety of computers, work stations, or modem hardware and/or software platforms. Thus, the present invention may be implemented in a hardware and/or software using any known later developed systems or structures, devices and/or software by those of ordinary skill in the applicable art from the functional description provided herein and with a general basic knowledge of the computer and telecommunications arts.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A data recording and playback system comprising:
   a monitoring device that provides an input signal data;
   a memory device adapted to receive and temporarily store said input signal data from said monitoring device as data frames with time stamps, each data frame including one time stamp and said memory device having addresses associated thereto, and said data frames having a dynamic frame size; and
   a circular storage buffer having a memory mapped file with same address space as said memory device, said circular storage buffer being adapted to receive said temporarily stored input signal data from said memory device, and to store said input signal data in said memory mapped file.

2. The system of claim 1, further including a digitizer that digitizes said input signal data when said input signal data is an analog signal.

3. The system of claim 1, wherein said input signal data is at least one of a video and an audio signal.

4. The system of claim 1, wherein said input signal data contains redundant information to permit compression thereof prior to storage in said circular storage buffer.

5. The system of claim 1, wherein said memory mapped file is adapted to allow playback of stored input signal data from said circular storage buffer without interrupting simultaneous recording of new input signal data into said circular storage buffer.

6. The system of claim 1, wherein said circular storage buffer stores recent data frames over aged data frames in said memory mapped file.

7. The system of claim 6, wherein said input signal data stored in said memory mapped file of said circular storage buffer is transferred to a file system.

8. The system of claim 6, wherein said memory device is a random access memory of a computer.

9. The system of claim 8, wherein said circular storage buffer is provided on at least one hard disk drive of said computer.

10. The system of claim 1, further including an event controller that provides an event signal associated to a time of an external event, wherein said event signal associates said external event with said data frames of said input signal data.

11. The system of claim 10, further including an event database for storing at least said event signal.

12. The system of claim 11, further including an event processor that copies plurality of data frames stored in said circular storage buffer that have time stamps proximate to said time of said event into said memory mapped file indexed from said event database.

13. The system of claim 12, further including an access controller adapted to retrieve said plurality of data frames that have time stamps proximate to said time of said event from said event database.

14. The system of claim 13, wherein said event database is provided in at least one hard disk drive of a computer.

15. The system of claim 13, wherein said access controller is connected to a network to allow remote access thereof.

16. The system of claim 15, further including at least one client device connected to said network, said at least one client device being adapted to remotely control said access controller.

17. The system of claim 16, wherein said at least one client device is a computer having a display device for displaying said plurality of data frames copied from said circular storage buffer.

18. The system of claim 17, wherein said at least one client device is a plurality of computers connected to said network, each of said plurality of client devices being adapted to remotely control said access controller.

19. A method for recording and playback of data comprising the steps of:
providing an input signal data;
temporarily storing said input signal data from said monitoring device as data frames with time stamps in a memory device, each data frame including one time stamp and said memory device having addresses associated thereto, and said data frames having a dynamic frame size;
providing a circular storage buffer having a memory mapped file with same address space as said memory device; and
storing said input signal data in said memory mapped file.

20. The method of claim 19, further including the step of storing recent data frames over aged data frames in said memory mapped file.

21. The method of claim 19, further including the step of transferring the stored input signal data from said memory mapped file of said circular storage buffer to a file system.

22. The method of claim 19, further including the step of digitizing said input signal data when said input signal data is an analog signal.

23. The method of claim 19, wherein said input signal data is at least one of a video and an audio signal.

24. The method of claim 19, further including the step of compressing redundant information in said input signal data prior to storage in said circular storage buffer.

25. The method of claim 19, wherein said memory mapped file is adapted to allow playback of stored input signal data from said circular storage buffer without interrupting simultaneous recording of new input signal data into said circular storage buffer.

26. The method of claim 19, further including the step of providing an event signal associated to a time of an external event, wherein said event signal associates said external event with said data frames of said input signal data.

27. The method of claim 26, further including the step of copying plurality of data frames stored in said circular storage buffer that have time stamps proximate to said time of said event into said memory mapped file.

28. The method of claim 27, further including the step of retrieving said plurality of data frames that have time stamps proximate to said time of said event.

29. A non-transitory computer readable data storage media for recording and playback of data, the computer readable data storage media comprising one or more computer readable instruction configured to cause one or more computer processors to execute operations comprising:
temporarily storing an input signal data from a monitoring device as data frames with time stamps in a memory device, each data frame including one time stamp and said memory device having addresses associated thereto, and said data frames having a dynamic frame size;
providing a circular storage buffer having a memory mapped file with same address space as said memory device; and
storing said input signal data in said memory mapped file.

30. The non-transitory computer readable data storage media of claim 29, further including computer readable instructions configured to cause one or more computer processors to store recent data frames over aged data frames in said memory mapped file.

31. The non-transitory computer readable data storage media of claim 29, further including computer readable instructions configured to cause one or more computer processors to transfer the stored input signal data from said memory mapped file of said circular storage buffer to a file system.

32. The non-transitory computer readable data storage media of claim 29, further including computer readable instructions configured to cause one or more computer processors to digitize said input signal data when said input signal data is an analog signal.

33. The non-transitory computer readable data storage media of claim 29, wherein said input signal data is at least one of a video and an audio signal.

34. The non-transitory computer readable data storage media of claim 29, further including computer readable instructions configured to cause one or more computer processors to compress redundant information in said input signal data prior to storage in said circular storage buffer.

35. The non-transitory computer readable data storage media of claim 29, wherein said memory mapped file is adapted to allow playback of stored input signal data from said circular storage buffer without interrupting simultaneous recording of new input signal data into said circular storage buffer.

36. The non-transitory computer readable data storage media of claim 29, further including computer readable instructions configured to cause one or more computer processors to provide an event signal associated to a time of an external event, wherein said event signal associates said external event with said data frames of said input signal data.

37. The non-transitory computer readable data storage media of claim 36, further including computer readable instructions configured to cause one or more computer processors to copy a plurality of data frames stored in said circular storage buffer that have time stamps proximate to said time of said event into said memory mapped file.

38. The non-transitory computer readable data storage media of claim 37, further including computer readable instructions configured to cause one or more computer processors to retrieve said plurality of data frames that have time stamps proximate to said time of said event.

* * * * *